Figure 1:
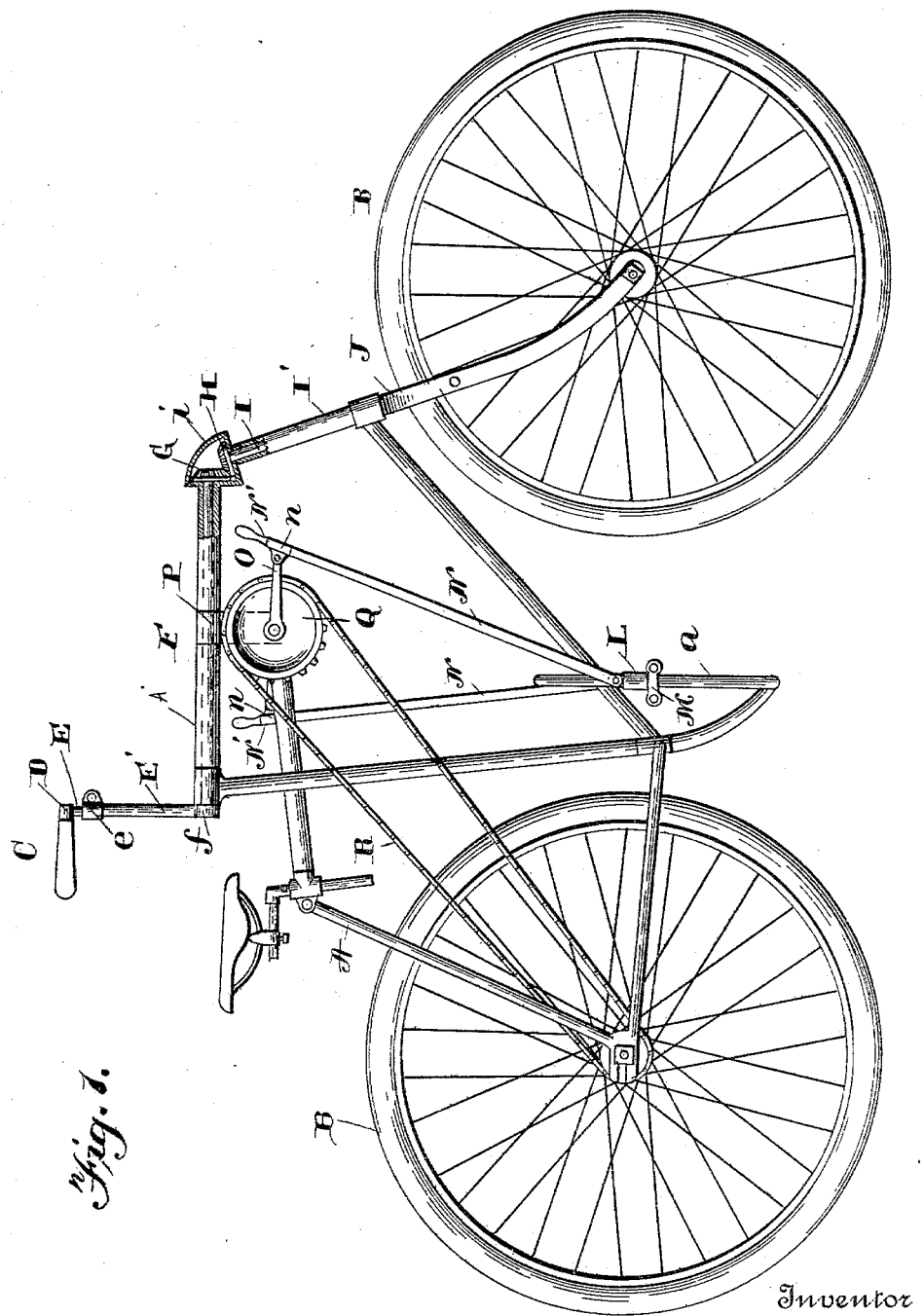

(No Model.)  
2 Sheets—Sheet 1.

C. B. FIELDS.
BICYCLE.

No. 566,568. Patented Aug. 25, 1896.

Witnesses  
Geo. E. Fuchs  
Franklin H. Hough

Inventor  
Carl B. Fields  
by  
A. L. Hough  
Attorney

THE NORRIS PETERS CO., PHOTO-LITHO., WASHINGTON, D. C.

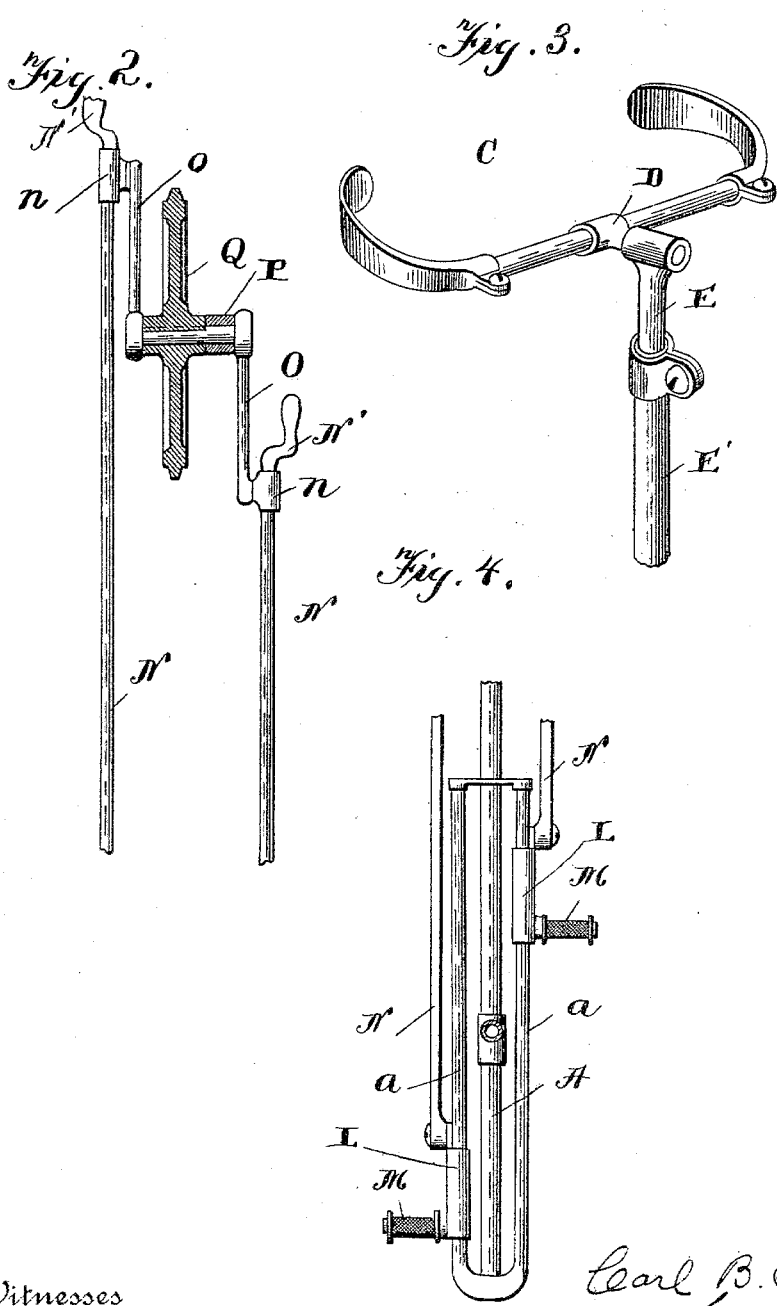

UNITED STATES PATENT OFFICE.

CARL B. FIELDS, OF MERCED, CALIFORNIA.

BICYCLE.

SPECIFICATION forming part of Letters Patent No. 566,568, dated August 25, 1896.

Application filed November 29, 1895. Serial No. 570,465. (No model.)

*To all whom it may concern:*

Be it known that I, CARL B. FIELDS, a citizen of the United States, residing at Merced, in the county of Merced and State of California, have invented certain new and useful Improvements in Bicycles; and I do hereby declare the following to be a full, clear, and exact description of the invention, such as will enable others skilled in the art to which it appertains to make and use the same.

This invention relates to certain new and useful improvements in bicycles; and the especial object of the invention is to produce a bicycle having propelling mechanism by which both the arms and the feet of the rider and operator may be utilized at the same time in the propulsion of the wheel.

A further aim of the invention is to produce a bicycle having propelling mechanism whereby both the legs and arms of the rider may be utilized for propelling purposes, while the motion of the body of the rider effects the steering of the wheel, the arms of the rider only being utilized for operating crank-levers which are connected by pitmen to reciprocating slides carrying pedals.

To these ends and to such others as the invention may pertain the same consists, further, in the novel construction, combination, and adaption of the parts, as will be hereinafter more fully described, and then specifically defined in the appended claim.

I clearly illustrate my invention in the accompanying drawings, which, with the letters of reference marked thereon, form a part of this specification, and in which drawings similar letters of reference indicate like parts throughout the several figures, in which—

Figure 1 is a side elevation of my improved bicycle. Fig. 2 is a front elevation of the pitman-arms and cranks having connection therewith. Fig. 3 is an enlarged detail view of the steering mechanism, and Fig. 4 is a detail view of the slides carrying the pedals.

Reference now being had to the details of the drawings by letter, A designates the framework of the machine, having its various sections brazed together and mounted in suitable bearings on the wheels B B.

The steering mechanism, which is operated by the motion of the body, is constructed as follows: The curved bow C is designed to partially encircle the body of the rider and is provided with a stub-shaft D, which has a pivotal bearing in the elbow E, which latter has one of its arms vertically adjustable and sliding within the hollow tubing E', and designed to be held in a fixed position by means of a clamping member e, whereby the steering-bow may be raised or lowered, as may be desired.

The tubing E' is connected to a tubing F, turning within the horizontal tubing A' of the framework of the machine by means of the elbow *f*, and the forward end of said tubing F is provided with beveled gear G, meshing with a bevel-gear H, carried on the upper end of the head I, which is connected at its lower end to the forks J, and is inclosed within the hollow tubing I', forming a portion of the framework of the machine, a suitable elbow *i* being provided to connect the portions A' and I of the frame, while ball-bearings are preferably used wherever the various parts of the steering mechanism are supported within the frame of the machine.

Securely held at the extended lower end *a* of the framework is the oblong tubular frame, having its upper portion secured to the tubing extending to the forks, and the said tubular frame is perpendicularly disposed, and slides L are provided, which are adapted to work up and down, one on each longitudinal tube. At the lower end of each of said slides is carried a pedal M, and to the upper end of each is pivoted the lower end of a pitman N. The upper end of each pitman is formed into a handle and is preferably bent outward at an angle, as seen in the detail view at N'. To allow of the adjustment of the said handles, I prefer to make them separate from the pitmen, and adapted to telescope therein, and held in a fixed position by means of the grips or clamps *n*, which have pivoted thereto the cranks O, which are keyed to the axle journaled in the bracket P, supported from the horizontal portion of the framework of the machine. Upon this axle is keyed the sprocket-wheel Q, about which a sprocket-chain R passes and connects the same with the sprocket-wheel on the axle of the rear wheel of the bicycle.

The seat is of ordinary construction and supported on the machine in the well-known way.

From the foregoing it will be readily seen that the rider while sitting in a natural position on the saddle may, by slightly moving his body to the right or left, easily guide the wheel, while he may use both his arms and legs to do the propelling.

I am aware that it is old to steer a machine by means of the body, and also to utilize both the arms and the legs in propelling the wheel, and hence I do not claim broadly.

What I do claim, however, and desire to secure by Letters Patent, is—

In a bicycle, the combination with the horizontal tubing A' and head I, of the machine, in which is mounted the geared steering mechanism as described, of the upright tubing, supporting the rear end of said tubing A', its lower end extending below the frame proper, of the two vertical parallel rods $a$ connected together at their lower curved ends and supported on the lower forwardly-curved end of the said upright tubing, of the sliding collars L working on said rods $a$, the stirrups carried at the lower ends of said collars, and pins at their upper ends, of the pitmen-rods N, secured at their lower ends, to the said pins, of the crank-arms O keyed to a sprocket-wheel shaft and provided with clamps $n$, of the telescoping handles N' held by the said clamps in the upper ends of the pitmen, of the bracket P supporting the sprocket shaft and wheel, and connections between same and the rear wheel of the bicycle, substantially as shown and described.

In testimony whereof I affix my signature in presence of two witnesses.

CARL B. FIELDS.

Witnesses:
A. T. HASTINGS,
T. A. MACK.